Patented Apr. 1, 1930

1,753,000

UNITED STATES PATENT OFFICE

HAROLD W. WALKER, OF EDGEWOOD ARSENAL, MARYLAND

WOOD PRESERVATION

No Drawing.   Application filed October 26, 1925. Serial No. 65,038.

(GRANTED UNDER THE ACT OF MARCH 3, 1883, AS AMENDED APRIL 30, 1928; 370 O. G. 757)

The invention described herein may be manufactured and used by or for the Government for Government purposes, without the payment to me of any royalty thereon.

This invention relates to a wood preservative and process of wood preservation.

Among the objects of this invention is the provision of a wood preservative which will afford protection to cut timber against dry rot, decay or attack by destructive organisms. A further object of this invention is to provide a wood preservative which will not be readily leached from the wood and which may be incorporated in the wood in sufficient amount to afford protection to wood during the economic life of the structure of timber. A further object of this invention is to provide a process whereby the preservative may be applied to the wood in a cheap, efficient and easy manner. A further object of this invention is to provide a process whereby this impregnation may be carried out in a very cheap, convenient and efficient manner and with the use of cheap and readily available materials.

The toxic, antiseptic and preservative properties of $As_2O_3$ have long been known in various industries. $As_2O_3$ is soluble in water at a temperature of 2° C. to the extent of 1.2 parts by weight per 100 parts of solution. At 40° C. it is soluble to the extent of 3 parts per 100 parts of solution. Consequently, when ordinary water is used as the solvent for the $As_2O_3$ in a wood preservative, only a small quantity of this poisonous material will be present and become incorporated in the wood. This small quantity is gradually decreased by leaching, due to weather conditions, moisture in the ground and other natural causes, and in a comparatively short time the amount of toxic material remaining in the wood is insufficient to prevent deterioration and eventual destruction of the wood.

I have found that by adding from 2.5-3% of ammonia to water, that as much as 20% of $As_2O_3$ can be dissolved therein as $As_2O_3$ and $NH_4AsO_2$. I impregnate the wood with such a solution, and after impregnation the excess solution is withdrawn from the impregnation vat or tank. The impregnated wood is then heated and the excess ammonia and water is practically all driven off, leaving the $As_2O_3$ as such in the pores of the wood in such quantity that the length of time required to leach out a sufficient amount of toxic material to leave the wood without sufficient preservative would be greater than the economic life of the timber structure.

The amount of ammonia that may be advantageously employed for this process is from 1–4% of the solution. It is not advisable to use too much ammonia because the $As_2O_3$ is highly soluble in an ammoniacal solution of 1–4% and an excess quantity of ammonia has no substantially apparent effect on the preservative properties of the solution.

In heating the wood after impregnation with the preservative, the excess ammonia which is driven off may be collected in water and reused for succeeding batches, and the loss of ammonia by this process may be kept rather low.

Although I prefer to use an ammoniacal solution of $As_2O_3$, the invention is not limited thereto but includes the use of other ammoniacal solutions of arsenic compounds, examples of which are the sulphides of arsenic, $As_2S_2$, $As_2S_3$ and $As_2S_5$. These sulphides are brought into solution by treating with ammonius hydroxide. A similar effect is obtained by using a solution of $As_2O_3$ in ammonium sulphide.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claim.

I claim as my invention:

A process for treating wood comprising impregnating the wood only with arsenic trioxide carried in an aqueous solution of ammonia, withdrawing the excess solution from the wood, heating and drying the impregnated wood and recovering the ammonia evolved.

HAROLD W. WALKER.